United States Patent
Becker et al.

(10) Patent No.: US 8,290,654 B2
(45) Date of Patent: Oct. 16, 2012

(54) METHOD FOR INTERRUPTING THE FORCE FLUX IN THE DRIVE TRAIN OF A VEHICLE IN THE EVENT OF A CRASH

(75) Inventors: Joerg Becker, Eberdingen (DE); Ralf Keller, Pforzheim-Eutingen (DE); Jurgen Metzler, Gaggenau (DE)

(73) Assignee: Dr. Ing h.c.F. Porsche Aktiengesellschaft (DE)

( * ) Notice: Subject to any disclaimer, the term of this patent is extended or adjusted under 35 U.S.C. 154(b) by 314 days.

(21) Appl. No.: 12/710,453

(22) Filed: Feb. 23, 2010

(65) Prior Publication Data
US 2010/0235029 A1  Sep. 16, 2010

Related U.S. Application Data

(60) Provisional application No. 61/162,715, filed on Mar. 24, 2009.

(30) Foreign Application Priority Data

Mar. 16, 2009  (DE) .......................... 10 2009 013 398

(51) Int. Cl.
G06F 19/00   (2011.01)

(52) U.S. Cl. ............... 701/22; 701/45; 701/54; 903/945

(58) Field of Classification Search .................... 701/22, 701/45, 49, 51, 54, 62, 65, 1; 903/945
See application file for complete search history.

(56) References Cited

U.S. PATENT DOCUMENTS

| | | | |
|---|---|---|---|
| 6,135,914 A * | 10/2000 | Yamaguchi et al. | 477/3 |
| 6,244,403 B1 * | 6/2001 | Ito et al. | 192/35 |
| 6,604,596 B2 * | 8/2003 | Bracke et al. | 180/242 |
| 6,668,953 B1 | 12/2003 | Reik et al. | |
| 6,705,416 B1 * | 3/2004 | Glonner et al. | 180/65.23 |
| 6,793,034 B2 * | 9/2004 | Raftari et al. | 180/285 |
| 6,887,180 B2 | 5/2005 | Pels et al. | |
| 7,335,131 B2 | 2/2008 | Smithberger et al. | |
| 2007/0095584 A1 * | 5/2007 | Roske et al. | 180/65.2 |
| 2009/0287383 A1 * | 11/2009 | Fujii et al. | 701/51 |
| 2012/0010791 A1 * | 1/2012 | Conn et al. | 701/54 |

FOREIGN PATENT DOCUMENTS

| | | |
|---|---|---|
| CN | 1997539 | 11/2007 |
| CN | 101066674 | 11/2007 |
| DE | 199 33 242 | 1/2000 |
| DE | 199 17 665 | 10/2000 |
| DE | 100 36 504 | 2/2001 |
| DE | 102 09 514 | 10/2002 |
| DE | 10 2006 034 297 | 1/2007 |
| DE | 10 2005 051 382 | 5/2007 |
| DE | 10 2006 007 960 | 9/2007 |
| DE | 10 2007 051 504 | 4/2009 |

* cited by examiner

*Primary Examiner* — Khoi Tran
*Assistant Examiner* — Jason Holloway
(74) *Attorney, Agent, or Firm* — Gerald E. Hespos; Michael J. Porco

(57) ABSTRACT

A method is provided for interrupting the force flux in the drive train of a vehicle in the event of a crash. The method includes disconnecting an electric machine, which is provided in the drive train, from a driven axle. In the event of a crash an automatic transmission (G) that is arranged in the drive train between the electric machine (EM) and a driven axle (A) is shifted into a neutral position.

4 Claims, 2 Drawing Sheets

METHOD FOR INTERRUPTING THE FORCE FLUX IN THE DRIVE TRAIN OF A VEHICLE IN THE EVENT OF A CRASH

CROSS-REFERENCE TO RELATED APPLICATIONS

This application claims priority under 35 USC 119 to German Patent Application No. 10 2009 013 398.4 filed on Mar. 16, 2009 and U.S. Provisional Patent Appl. No. 61/162,715 filed on Mar. 24, 2009, the entire disclosures of which are incorporated herein by reference.

BACKGROUND OF THE INVENTION

1. Field of the Invention

The invention relates to a method for interrupting the force flux in the drive train of a vehicle in the event of a crash.

2. Description of the Related Art

Hybrid or electric vehicles have at least one electric machine connected electrically to a high-voltage battery in the drive train. The electric machine may be operated as a motor by supplying the electric machine with electric current from the high-voltage battery. In this case, the electric machine can at least proportionally drive one axle of the vehicle (electrical travel or boosting). The electric machine also may be operated as a generator. In this case, the electric machine can charge the high-voltage battery with electric current either by transmitting rotational movement of an axle to the electric machine (energy recovery) or by using the internal combustion engine to rotate the electric machine. However, an electrical high-voltage line can be damaged in the event of a crash of the vehicle, and the damaged electrical high-voltage line can cause electro-thermal effects to occur when the electric machine is operated briefly as a generator.

U.S. Pat. No. 6,793,034 B2 discloses using a separate mechanical interruption unit per axle or per wheel to achieve a reliable interruption of the force flux between an electric machine and a driven axle of the drive train. However, this constitutes a structurally complex and therefore expensive solution.

The object of the present invention is to propose a simple and cost-effective alternative.

SUMMARY OF THE INVENTION

The invention relates to a vehicle with an automatic transmission arranged in the drive train between the electric machine and the driven axle or axles and is operative to shift the automatic transmission into a neutral position in the event of a crash of the vehicle. The method of the invention therefore reliable decouples the electric machine from the drive axle in the event of a crash of a vehicle that has an automatic transmission in the drive train. The transmission can be any conventional transmission that can be shifted into a neutral position in an automated fashion. The invention does not require any change to the automatic transmission itself. Rather, the invention merely requires a modification of the actuation of the automatic transmission, for example by means of suitable modification in the transmission control device. The invention therefore uses a suitable control logic to implement the same effect as the mechanical device in U.S. Pat. No. 6,793,034 B2. This results in a particularly simple and cost-effective way of interrupting the force flux in the drive train of a vehicle in the event of a crash.

The method of the invention is particularly preferable for use in a parallel hybrid vehicle. More particularly, a parallel hybrid vehicle has a drive train with an internal combustion engine, an electric machine and an automatic transmission arranged on a common shaft. A clutch is provided between the internal combustion engine and the electric machine. The clutch enables the vehicle to be driven by the electric machine and/or the internal combustion engine. The clutch is closed in the event of a crash of the vehicle. The supply of fuel to the internal combustion engine usually is stopped immediately in the event of a crash, and as a result the internal combustion engine assumes a stationary state. Since the clutch has been closed, the electric machine is stopped via the internal combustion engine. The inventive shifting of the automatic transmission into a neutral position interrupts the force flux between the electric machine and the drive axle. Thus, the rotational movement of a drive axle can no longer be transmitted to the electric machine. Therefore, rotation of the electric machine and, accordingly operation of the electric machine as a generator, reliably is prevented in the event of a crash of the vehicle.

Reliable detection of a crash of the vehicle is possible by means of a signal (crash signal) generated by an acceleration sensor and/or an airbag control device of the vehicle. The automatic transmission is shifted into a neutral position when such a signal occurs.

A redundant signal transmission can be provided to further increase safety in the event of a crash. For this purpose, the crash signal is transmitted from the generating means (e.g. the acceleration sensor or the airbag control device) to the processing means (e.g. the transmission control device) in the vehicle by appropriate signal transmission means, such as additional lines and/or signal paths.

The automatic transmission is shifted into a neutral position if a control signal of a networked transmission controller fails, thereby improving safety. Such a failure, for example of the CAN signal of the transmission control device, also characterizes a crash situation of the vehicle.

The invention will now be presented in more detail with reference to a drawing.

DETAILED DESCRIPTION OF THE PREFERRED EMBODIMENT

Figure 1:
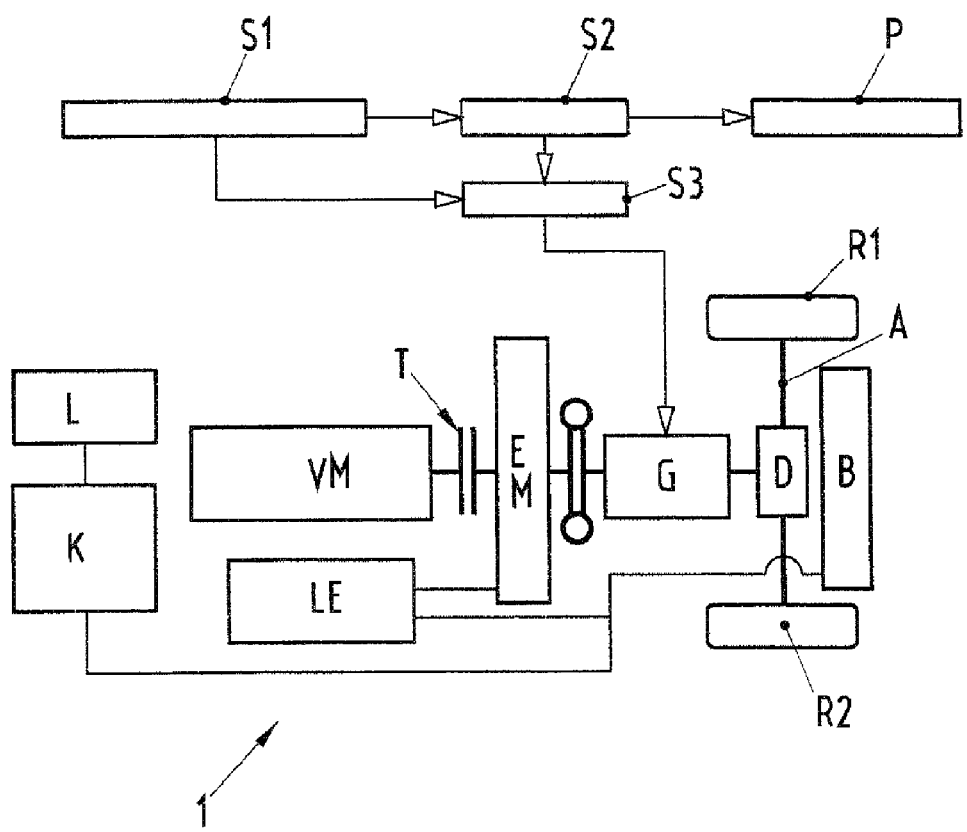
FIG. 1 is a schematic illustration of a preferred embodiment of the invention with a corresponding signal transmission and FIG. 2 is a flow diagram illustrating the method of the invention.

A single-shaft parallel hybrid vehicle is identified generally by the numeral 1 in FIG. 1. The vehicle 1 has an internal combustion engine VM that is arranged together with an electric machine EM on an input shaft of an automatic transmission G. A clutch T is provided between the electric machine EM and the internal combustion engine VM. A differential D for driving two wheels R1, R2 of a drive axle A of the hybrid vehicle 1 is provided on an output shaft of the automatic transmission G. The electric machine EM is connected electrically to a high-voltage battery B via power electronics LE. The high-voltage battery B also supplies current to an electric steering means L and an electric air-conditioning system K.

If the clutch T is closed, both the internal combustion engine VM and the electric machine EM, which is operated as a motor, conduct force or torque into the automatic transmission G to drive the drive axle A of the hybrid vehicle 1. If the clutch T is opened, only the electric machine EM applies force or torque to the automatic transmission G and therefore permits purely electric travel of the hybrid vehicle 1.

The electric machine EM can operate as a generator if the hybrid vehicle 1 is to be braked and the braking can be brought about by the force applied in this way. Additional current may be required during operation of the hybrid vehicle 1. In this situation, the internal combustion engine VM actuates the electric machine EM, in addition to the drive axle A, and the electric machine EM is operated as a generator. In both cases, current is produced by the rotation of the electric machine EM. This current is transmitted through electric lines, for example three-phase high-voltage lines, between the electric machine EM, the power electronics LE and the high-voltage battery B. As a result, high power is present when the electric machine EM rotates.

Figure 2:
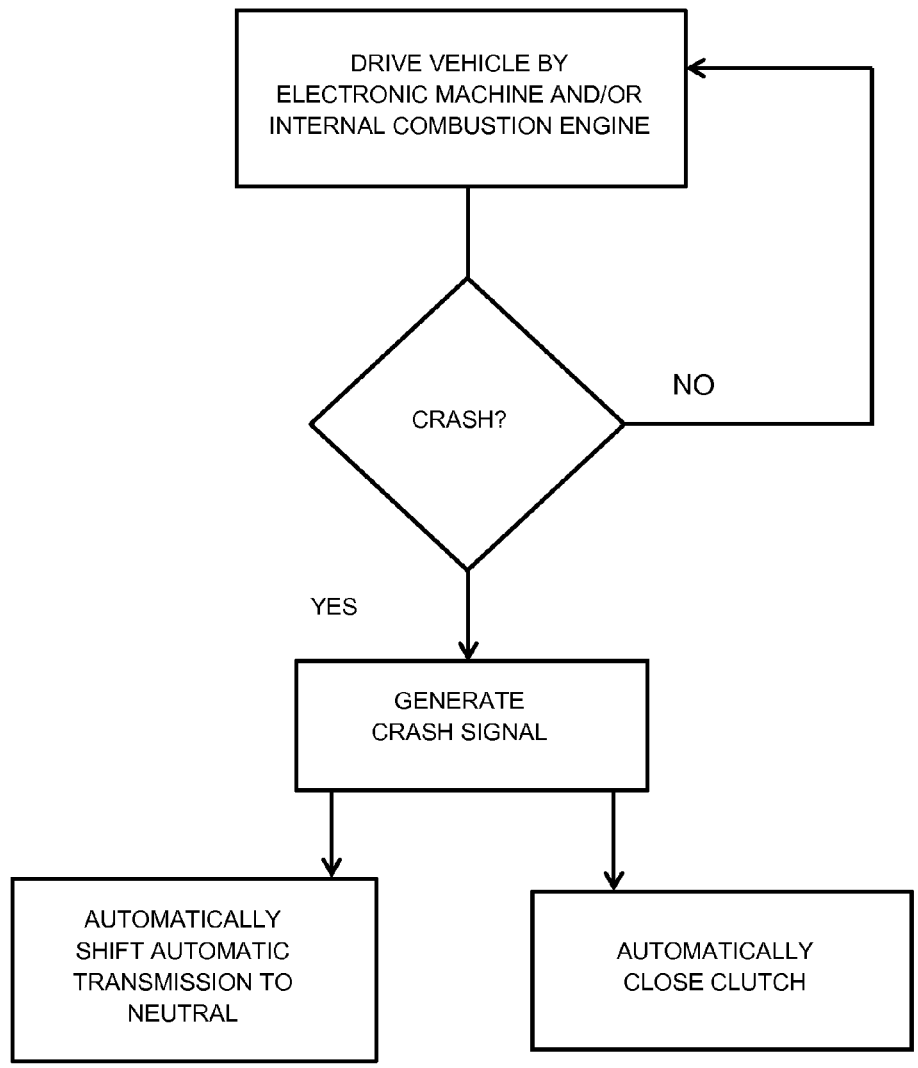

An airbag control device S1 transmits a crash signal to an engine control device S2, for example via a vehicle bus (CAN), if a crash of the hybrid vehicle 1 exceeds a crash triggering threshold. The fuel pump P of the internal combustion engine VM is stopped immediately if this crash signal is present at the engine control device S2. This permits the internal combustion engine VM to stop within a short time after the occurrence of the crash signal. The generation of the crash signal also causes the clutch T, which preferably is embodied hydraulically, to be placed automatically in its closed basic state, as shown in FIG. 2. The fuel pump P no longer delivers fuel to the internal combustion engine VM, and hence the internal combustion engine VM assumes a stationary state. The clutch T between the internal combustion engine VM and the electric machine EM also is closed, as shown in FIG. 2. The internal combustion engine VM of a single-shaft parallel hybrid usually has a significantly higher rotational mass than the electric machine EM. Thus, the stationary internal combustion engine VM also stops the electric machine EM.

The automated closing of the clutch T in the event of a crash of the hybrid vehicle 1 permits the electric machine EM to stop reliably. However, in certain configurations rotation of the drive axle A could be transmitted to the electric machine EM via the automatic transmission G. Given corresponding application of force by the drive axle A, the electric machine EM and the internal combustion engine VM, which is coupled via the closed clutch T, could be made to rotate here. The rotation of the electric machine EM would then produce a corresponding high voltage. This high voltage also would be present on the electric lines between the electric machine EM and the power electronics LE and between the power electronics LE and the high-voltage battery B. These electric lines can suffer damage in a crash, and as a result, the high voltage that is present could produce the danger of electrothermal effects, for example could cause a fire.

The automatic transmission G is shifted into a neutral position in the event of a crash of the hybrid vehicle 1. For this purpose, the airbag control device S1 also transmits the crash signal to a transmission control device S3, for example via a vehicle bus (CAN), when the crash triggering threshold is exceeded. The transmission control device S3 causes the automatic transmission G to shift into a neutral position if a corresponding crash signal is present at the transmission control device S3. The automatic transmission G now no longer permits force flux from the drive axle A to the electric machine EM, thereby reliably interrupting the transmission of force from a rotating drive axle A of the hybrid vehicle 1 to the electric machine EM. The transmission control device S3 can be actuated redundantly for further assuring safety in the event of a crash. For this purpose, the transmission control device S3 evaluates a signal of the engine control device S2 in addition to the crash signal of the airbag control device S1. The engine control device S2 switches off the fuel pump P when a crash signal of the airbag control device S1 is present at the engine control device S2 and also transmits a signal to the transmission control device S3. As a result, two signals are transmitted to the transmission control device S3 independently of one another in the event of a crash of the hybrid vehicle 1. As a result, the transmission control device S3 reliably causes the automatic transmission G to shift into a neutral position.

What is claimed is:

1. A method for interrupting force flux in a drive train of a parallel hybrid vehicle in the event of a crash, the drive train of the vehicle having an internal combustion engine, an electric machine and an automatic transmission arranged on a common shaft to drive a driven axle, a clutch being provided between the internal combustion engine and the electric machine so that the vehicle can be driven by the electric machine or the enternal combustion engine, wherein in the closed position, both the internal combustion engine and the electric machine are engaged and in the open position only the electric machine is engaged, the method comprising: sensing occurrence of a crash; generating a crash signal in response to a sensed occurrence of a crash; in response to a presence of the crash signal, automatically shifting the automatic transmission into a neutral position and automatically closing the clutch.

2. The method of claim 1, wherein the step of generating a crash signal comprises generating a crash signal by at least one of an acceleration sensor and an airbag control device in the event of a crash of the vehicle.

3. The method of claim 2, further comprising redundantly transmitting the generated signal.

4. The method of claim 1, further comprising sensing a failure of a control signal of a networked transmission controller and then shifting the vehicle transmission into a neutral position.

* * * * *